H. B. LORENTZEN.
ELECTRIC FURNACE FOR SMELTING AND REDUCTION OF ORE.
APPLICATION FILED DEC. 2, 1910.

1,030,904.

Patented July 2, 1912.

WITNESSES

INVENTOR
Hans Bie Lorentzen
by Connolly Bros
Attorneys

UNITED STATES PATENT OFFICE.

HANS BIE LORENTZEN, OF NOTODDEN, NORWAY.

ELECTRIC FURNACE FOR SMELTING AND REDUCTION OF ORE.

1,030,904.  Specification of Letters Patent.  Patented July 2, 1912.

Application filed December 2, 1910. Serial No. 595,264.

*To all whom it may concern:*

Be it known that I, HANS BIE LORENTZEN, a subject of the King of Norway, residing at Notodden, Norway, have invented certain new and useful Improvements in Electric Furnaces for Smelting and Reduction of Ore, of which the following is a specification, reference being had therein to the accompanying drawing.

The invention relates to improvements in electric furnaces for smelting and reduction of ores of the kind in which the smelting chamber is divided by a partition wall bridge of nonconducting material.

The object of the invention is to provide certain arrangements in order to avoid a top-electrode and obtain higher efficiency and a greater durability of the material of which the furnace is built up. With this and other objects in view I build the partition wall or bridge with a contraction toward the center of the furnace and perpendicular to the direction of the current for the purpose of obtaining here a very small cross section of the bridge and the space for the ore charge. In this way the bridge offers a comparatively high resistance to the current thereby compelling the latter to travel the longer path through the molten product and the greater bulk of charge; and I further build the bridge mainly with walls having an exterior surface for the purpose that side walls shall keep cool on account of the contact with the outside air; and further I introduce the gases from the top of the shaft more or less through the bridge, whereby the gases also contribute to the cooling of the bridge, without thereby taking off any heat from the furnace, and the distribution of heat thereby obtained, will increase the efficiency of the furnace.

When used for reduction of ore, for instance of iron ore, I provide a furnace with a superposed shaft.

On the appended drawing I show my improved furnace as adapted for reduction of iron ore.

Figure 1:
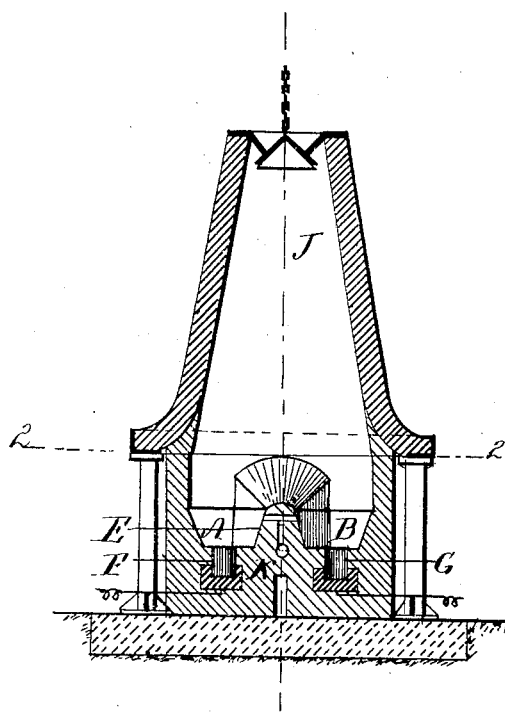
Figure 3:
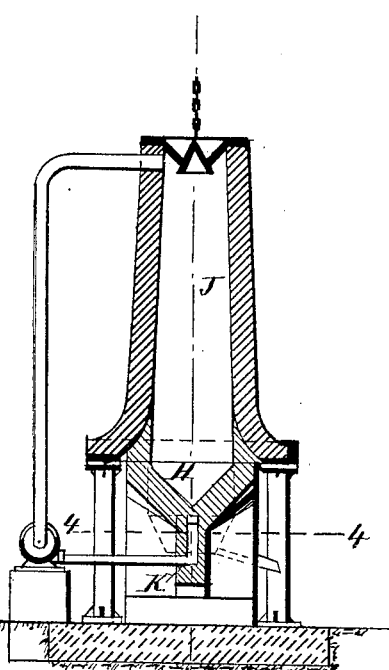
Figure 2:
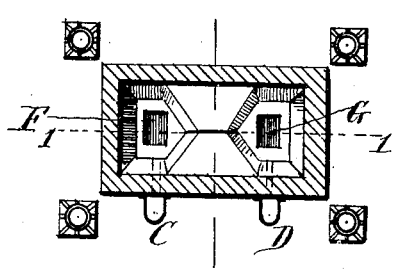
Figure 4:
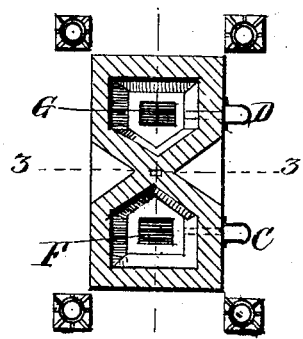

Figure 1 is vertical section on line 1—1 in Fig. 2, Fig. 2 is horizontal section on line 2—2 in Fig. 2, Fig. 3 is vertical section on line 3—3 in Fig. 4, Fig. 4 is horizontal section on line 4—4 in Fig. 3.

A and B are the hearths of the furnace; C and D the tapholes; E is the bridge separating the said hearths; F and G are the electrodes mounted in the bottom of the chambers A, B.

The distinguishing feature of my improved furnace is the construction of the bridge E separating the hearths, said bridge being reduced in section toward its center, *i. e.*, toward a point H, Fig. 3, opposite the two electrodes, the object being to provide a section of ore-charge, which offers high resistance to the current, thereby compelling the latter to take its way through the molten product and through the charge. The furnace is further so constructed that the largest section of the ore charge is presented to the current farthest away from the bridge and the smallest section near the latter. By this construction of the bridge I obtain that the latter may as far as possible be built with walls having the exterior surface exposed to the air so as to obtain efficient cooling of said walls.

It is absolutely necessary to make the above described arrangement, for if the bridge were to be made as an ordinary wall across the entire width of the furnace in its hottest zone, the bridge would very soon be heated to a temperature by which all such building materials, as can be employed, would become conductive for the current, and the latter would then take the shortest way through the bridge instead of the intended one through the charge, and the result would be that the whole bridge would very soon melt away even if cooling with water was tried.

In case the furnace is to be employed for the reduction of ore, for instance of iron ore, I provide a superposed shaft J, which is mounted on pillars or the like, independently of the furnace. In such case I provide means for conducting the comparatively cold gases from the top of the shaft into the furnace, the said gases being introduced for instance through passages K. Beyond utilizing the gases in the most efficient manner I also obtain a further cooling of the bridge without depriving the furnace of any heat. The distribution of heat hereby obtained will tend to increase the efficiency of the furnace.

Having explained and described my invention, what I claim is:—

1. An electric furnace of the character described having a bridge located between and separating its hearths, said bridge being reduced in section toward its center, and having a superposed shaft, and means for conducting the colder gases from the top of the shaft into the furnace.

2. An electric furnace of the character described, having a bridge located between and separating its hearths and formed with a passage for gases from the outside of the furnace to the hearths, a superposed shaft, a conduit for gases leading from the upper part of the shaft to the passage in the bridge and means for promoting a flow of gases from the shaft through the bridge.

In testimony whereof I affix my signature in presence of two witnesses.

HANS BIE LORENTZEN.

Witnesses:
O. HARRIS,
N. G. TANDBERG.